United States Patent
Overkamp et al.

(10) Patent No.: US 12,528,978 B2
(45) Date of Patent: Jan. 20, 2026

(54) WATER-BASED DISPERSION FLOOR ADHESIVE WITH HIGH DIMENSIONAL STABILITY

(71) Applicant: SIKA TECHNOLOGY AG, Baar (CH)

(72) Inventors: Bernd Overkamp, Horstmar (DE); Tobias Benighaus, Münster (DE); Steffen Maier, Wettingen (CH)

(73) Assignee: SIKA TECHNOLOGY AG, Baar (CH)

( * ) Notice: Subject to any disclaimer, the term of this patent is extended or adjusted under 35 U.S.C. 154(b) by 605 days.

(21) Appl. No.: 17/792,262

(22) PCT Filed: Mar. 2, 2021

(86) PCT No.: PCT/EP2021/055202
§ 371 (c)(1),
(2) Date: Jul. 12, 2022

(87) PCT Pub. No.: WO2021/175862
PCT Pub. Date: Sep. 10, 2021

(65) Prior Publication Data
US 2023/0059391 A1    Feb. 23, 2023

(30) Foreign Application Priority Data

Mar. 6, 2020 (EP) .................................. 20161622

(51) Int. Cl.
*C09J 133/06* (2006.01)
*C08K 3/26* (2006.01)
*C08K 3/34* (2006.01)

(52) U.S. Cl.
CPC ............ *C09J 133/064* (2013.01); *C08K 3/26* (2013.01); *C08K 2003/265* (2013.01); *C08K 3/346* (2013.01); *C08K 2201/003* (2013.01)

(58) Field of Classification Search
CPC ........ C09J 133/064; C08K 3/26; C08K 3/346; C08K 2003/265; C08K 2201/003
See application file for complete search history.

(56) References Cited

U.S. PATENT DOCUMENTS

| | | | | |
|---|---|---|---|---|
| 6,566,426 | B1 * | 5/2003 | Kanaida | C08K 3/10 |
| | | | | 524/96 |
| 2013/0210993 | A1 * | 8/2013 | Naito | B32B 7/12 |
| | | | | 524/560 |
| 2015/0218426 | A1 * | 8/2015 | Clay | C08L 23/0869 |
| | | | | 524/271 |
| 2017/0335129 | A1 * | 11/2017 | Wang | C09D 5/00 |
| 2019/0106562 | A1 * | 4/2019 | Thuresson | C08J 9/0023 |
| 2019/0322913 | A1 * | 10/2019 | Giesing | C08K 5/098 |

FOREIGN PATENT DOCUMENTS

| | | |
|---|---|---|
| DE | 19801892 A1 | 7/1999 |
| EP | 0490191 A2 | 6/1992 |
| EP | 0620243 A1 | 10/1994 |
| WO | WO-2019097039 A1 * | 5/2019 ............... B05D 1/36 |

OTHER PUBLICATIONS

May 20, 2021 Search Report issued in International Application No. PCT/EP2021/055202.

* cited by examiner

Primary Examiner — Robert S Jones, Jr.
Assistant Examiner — Zhen Liu
(74) Attorney, Agent, or Firm — Oliff PLC

(57) ABSTRACT

A single-component adhesive composition includes: an aqueous acrylic polymer dispersion comprising water and at least one water-dispersed acrylic polymer P; between 0.2 wt.-% and 2.0 wt.-%, preferably between 0.5 wt.-% and 1.5 wt.-%, based on the total composition, of at least one water-dispersed or water-dissolved cross-linker C that can react with carboxylate groups; and between 20 wt.-% and 60 wt.-%, based on the total composition, of at least one filler F with the mean particle size D50 of its primary particles being ≤10 μm, wherein said at least one water-dispersed acrylic polymer P contains free carboxylic acid groups. The composition is highly suitable as adhesive for floor coverings and shows good tack in the wet state and at the same time enables excellent dimensional stability of the bonded floor coverings.

13 Claims, No Drawings

WATER-BASED DISPERSION FLOOR ADHESIVE WITH HIGH DIMENSIONAL STABILITY

TECHNICAL FIELD

The invention relates to aqueous one-component compositions based on polymer dispersions and their use as adhesives, in particular floor adhesives.

BACKGROUND OF THE INVENTION

Single-component adhesives based on aqueous dispersions of polymers are commonly used, for example in the construction industry as floor adhesives. Compared to solvent-based adhesives, water-based adhesives mainly have the advantage that they do not emit as many volatile organic compounds (VOC) that are hazardous to health and the environment. Furthermore, they have generally a lower odor and are thus more consumer-friendly and suitable for indoor applications. Their curing or rather hardening mechanism to form a durable, tough and/or elastic adhesive material mainly involves drying of substantial parts of the water contained in the dispersion and increasing physical interactions between the polymers contained therein with decreasing water content. Such adhesives based on aqueous polymer dispersions thus usually simply solidify by evaporation of water. If the ambient temperature exceeds the minimum film forming temperature (MFFT), the water starts to evaporate at a significant rate and the polymer chains entangle and form a film. The cohesion of such materials is primarily based on physical interactions. Comparable to typical thermoplasts, these dried compositions normally suffer from mediocre mechanical properties, a tendency to creep under static loads, poor heat resistance, and swelling in many media such as water or solvents. One option to overcome these drawbacks is the use of chemical crosslinking reactions, e.g. with isocyanates. These systems are, however, normally not storage stable in the form of single-component (1K) systems and often need to be formulated at least in two-component (2K) systems with separated storage of the reactive species and the need for mixing before application. Other known options for chemical cross-linking involve the use of oxazolines, or carbodiimides, or multivalent ions such as zirconium. However, also in these cases, the storage stability in 1K systems is often low, and the gain of mechanical performance is often not comparable to true 2K systems.

Water-based floor adhesives are nowadays the standard adhesives in the field of installation of soft floor coverings like PVC, other thermoplastics, luxury vinyl tiles (LVT), linoleum, rubber or textile coverings. However, due to their limited strength and stiffness, water-based floor adhesive cannot be used in some areas that require higher strength. The most important area with increased requirements is the floor area close to deep windows. In such areas the sunlight can heat the floor coverings to up to 60° C. Under these conditions, the thermoplastic material tends to expand but the floor adhesive has to be strong and stiff enough to limit these expansions. Otherwise damages to the floor construction are possible. Currently, only 2K polyurethane (PU) and 1K silane-terminated polymer (STP) adhesives are used in these areas of more demanding heat-stability requirements.

2K PU adhesives are sufficiently strong and stiff for the application but they have certain disadvantages over water-based floor adhesives. Firstly, with a 2K product, mixing is necessary, pot life is limited, and left over material cannot be re-used. Secondly, the wet tack (surface tack in still wet state) is an important property of floor adhesives that helps the floor layers to work around corners, install resilient floors with roller tension, to install turn-ups (transition from floor to wall), etc. 2K PU adhesives usually have no sufficient tack. The third disadvantage of 2K PU adhesives is that they contain reactive isocyanate groups with allergenic potential. Additionally, PU adhesives are normally more expensive than water-based adhesives.

1K STP adhesives suffer from the following disadvantages compared to water-based floor adhesives. Their tack is also normally insufficient, similar to 2K PU adhesives. Furthermore, 1K STP floor adhesives tend to have a significantly higher viscosity than water-based such adhesives, which is detrimental for an easy application. Apart from that, also 1K STP adhesives generally have much higher costs than water-based adhesives.

There is therefore a need for 1K water-based adhesives that can be used in thermally demanding flooring applications, but do not exhibit the disadvantages of 2K PU adhesives, 1K STP adhesives or water-based adhesives of the state of the art.

SUMMARY OF THE INVENTION

The object of the present invention is to provide a single-component water-based floor adhesive with extra high shear stiffness to allow the installation of soft floor coverings in areas with high temperature changes, e.g. close to deep windows. Furthermore, it is an object of the present invention to provide such a water-based adhesive that enables a high dimensional stability of the thusly bonded floor coverings (with very low shrinking or expansion in changing ambient temperatures), a high storage stability or shelf life, a high shear stiffness, a high tack in the wet state, excellent adhesion on substrates relevant for flooring applications, and overall excellent mechanical properties in the dry state.

This objects can be achieved with a composition according to claim 1. Surprisingly, it has been found that the dimensional stability of water-based floor adhesives can be increased to unexpectedly high levels by synergistically combining two modifications: Firstly, during the drying process, the polymer chains are cross-linked with a suitable cross-linker, most preferably a zirconium carbonate cross-linker. This also enables the use of polymers with sufficient softness to achieve a good tack in the wet and semi-wet phase without compromising the strength of the cured adhesives. Secondly, it was found that the dimensional stability can be improved significantly by using finer fillers with a median particle size D50≤10 μm. Normally, calcium carbonate fillers with a D50>10 μm are used in floor adhesives. Even better results are obtained when the fine calcium carbonate is partially or totally replaced by a filler combining corpuscular silica with lamellar kaolinite, preferably with a D50 of 2 μm, more preferably with an aminosilane sizing.

The composition of the present invention combines the advantages of water-based and PU floor adhesives, by exhibiting a tack like a common water-based floor adhesive, a low viscosity for effortless application like a traditional water-based floor adhesive, much lower costs than STP adhesives and only slightly higher costs than traditional water-based adhesives, the favorable EHS profile of water-based adhesives, including being free of isocyanates, of tin organic compounds, and of methanol emissions, and the high dimensional stability of 2K PU or 1K STP adhesives in applications where soft floor coverings are subject to heat.

According to another aspect of the present invention, a method for adhesively joining two substrates is provided.

DETAILED DESCRIPTION OF THE INVENTION

Substance names beginning with "poly", such as polycarboxylate, designate substances which formally contain, per molecule, two or more of the functional groups occurring in their names, such as carboxylate groups.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

A "copolymer" is a polymer constituted of at least two different monomers that have been polymerized, such as two different (meth)acrylate monomers.

A "homopolymer" is a polymer constituted of only one kind of monomer, such as a (meth)acrylate monomer.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

The term "(meth)acrylic" designates methacrylic or acrylic. Accordingly, the term "(meth)acrylate" designates methacrylate or acrylate.

The term "polyacrylate polymer" designates polymers resulting from the free-radical polymerization of two or more (meth)acrylate monomers. Copolymers of the (meth)acrylate monomers and copolymers of (meth)acrylate monomers with other vinyl group containing monomers, such as styrene, are also included within the term "polyacrylate polymer". The terms "polyacrylate polymer", "polyacrylate" and "acrylate polymer" are used interchangeably.

The term "viscosity" refers to the dynamic viscosity or shear viscosity which is determined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

The term "shelf life" designates a time period after which a dispersion adhesive composition has substantially coagulated, separated or settled such that it cannot be readily applied to a surface of a substrate as homogeneous, uniform film or bead.

The term "wet peel strength" designates the resistance to a peel force developed in a time period of fifteen minutes after a layer of adhesive applied on the surface of a first substrate has been contacted with the surface of a second substrate. The wet peel strength depends on the length of the airing time, i.e. how long the layer of adhesive has been dried on the surface of the first substrate before being contacted with the surface of the second substrate, and on the composition of the adhesive. The wet peel strength describes the ability of the adhesive composition to build tack after a defined airing time.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing.

The term "room temperature" (abbreviated "RT") designates a temperature of 23° C.

The term "standard pressure" designates an absolute pressure of 1 bar.

The present invention relates in a first aspect of the invention to a single component adhesive composition comprising:

a) an aqueous acrylic polymer dispersion comprising water and at least one water-dispersed acrylic polymer P, b) between 0.2 wt.-% and 2.0 wt.-%, preferably between 0.5 wt.-% and 1.5 wt.-%, based on the total composition, of at least one water-dispersed or water-dissolved cross-linker C that can react with carboxylate groups;

c) between 20 wt.-% and 60 wt.-%, based on the total composition, of at least one filler F with the mean particle size D50 of its primary particles being ≤10 μm, measured by laser diffraction according to the method as described in standard ISO 13320:2009, wherein said at least one water-dispersed acrylic polymer P contains free carboxylic acid groups.

The term "dispersion" refers to a physical state of matter that includes at least two distinct phases, wherein a first phase is distributed in a second phase, with the second phase being a continuous medium. Preferably, the dispersion comprises a solid phase which is dispersed as solid particles in a continuous liquid phase.

The term "aqueous acrylic polymer dispersion" refers to an acrylic polymer dispersion having water as the main carrier. Preferably, the "aqueous" refers to a 100% water carrier.

Preferably, the aqueous acrylic polymer dispersion and accordingly the adhesive composition according to the present invention are free of organic solvents, in particular free of volatile organic compounds. The aqueous polymer dispersion and accordingly the adhesive composition according to the present invention are preferably prepared and formulated without volatile organic compounds and only contain water as volatile carrier or liquid phase. Preferably, the aqueous polymer dispersion and accordingly the adhesive composition according to the present invention comprises less than 5% by weight, preferably less than 1% by weight, based on the total weight of the aqueous polymer dispersion or the adhesive composition, of volatile organic compounds.

The term "volatile organic compounds" (VOC) herein means organic compounds that have a boiling point of less than 250° C. at a standard pressure of 101.3 kPa. The standard boiling point can be determined, for example, with an ebulliometer.

The term "mean particle size D50" is the D50 value of the primary particles. The D50 value is the value of the particle size distribution where exactly 50% of the particles present are larger and 50% of the particles present are smaller, wherein the D50 value refers to the number median. The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

Polymer P

The single-component adhesive composition according to the present invention comprises as a first essential ingredient an aqueous acrylic polymer dispersion comprising water and at least one water-dispersed acrylic polymer P, wherein said at least one water-dispersed polymer P contains free carboxylic acid groups. The term "free carboxylic acid groups" means that the polymer P contains chemically accessible carboxylic acid or carboxylate groups that can be chemically converted or complexed by polyvalent metal ions.

The optimal amount of carboxylic acid or carboxylate (depending on the pH) functional groups in the at least one water-dispersed acrylic polymer P is of course variable and depends, for example, on the amount of cross-linker C in the composition and the desired degree of cross-linking after drying of the composition. The skilled person in the field of polymer chemistry and/or formulation of reactive polymer systems is able to estimate or determine by routine experimentation a suitable density of carboxylic acid groups in polymer P. In general, the amount or density of carboxylic acid groups in polymer P should be sufficiently high that a proper chemical cross-linking is possible with the cross-linker C present. On the other hand, the composition is sufficiently robust that even a significant deviation of a 1:1 molar ratio of carboxylic acid groups in polymer P to functional groups in cross-linker C still leads to a useful, chemically curable composition.

Preferably, the molar ratio of carboxylic acid groups in polymer P to carboxylate-reactive functional groups or complexing polyvalent metal ions of cross-linker C in the composition is between 1:10 and 10:1, in particular between 1:5 and 5:1, more preferably between 1:2 and 2:1, especially between 1:1.5 and 1.5:1, most preferably between 1:1.1 and 1.1:1.

Suitable acrylic polymers P include, for example, poly (meth)acrylates, polyurethane-acrylates, carboxylated polystyrene-(meth)acrylate-copolymers, carboxylated butadiene-styrene-(meth)acrylate copolymers, carboxylated styrene-isoprene-(meth)acrylate copolymers, ethylene-(meth)acrylate copolymers, ethylene-ethyl acrylate copolymers, ethylene-butyl acrylate copolymers (EBA), ethylene-(meth)acrylic acid copolymers, ethylene-2-ethylhexyl acrylate copolymers, and ethylene-acrylic ester copolymers. The polymers mentioned above based on (meth)acrylate ester or acetate ester monomers need to contain a sufficiently high amount of non-esterified (meth)acrylate monomers.

The above-mentioned copolymers, meaning polymers made from more than one type of monomer, can be block type copolymers or random copolymers.

The amount of said at least one water-dispersed acrylic polymer P comprised in the composition preferably is between 10 and 50 wt.-%, preferably between 15 and 45 wt.-%, in particular between 20 and 40 wt.-%, based on the total weight of the adhesive after drying in air during 7 days at 40° C.

In preferred embodiments of the single-component adhesive composition according to the present invention, the at least one water-dispersed acrylic polymer P is selected from poly(meth)acrylate homopolymers, poly(meth)acrylate copolymers, styrene-(meth)acrylate copolymers, and vinyl-acetate-(meth)acrylate copolymers.

Apart from the acrylic polymer P, the composition preferably does not contain substances with free carboxylic acid or carboxylate groups in significant amounts so high that they inhibit the cross-linking of polymer P. Preferably, such substances are comprised in the composition in an amount of less than 25 mol %, preferably less than 10 mol %, relative to the molar amount of all carboxylic acid or carboxylate groups on said acrylic polymer P.

In some preferred embodiments, the aqueous acrylic polymer dispersion comprises of one or more water-dispersed polymers P, preferably free-radically polymerized polymer(s) obtained from ethylenically unsaturated monomers. Preferably, in the case of free-radically polymerized polymer(s), such polymers contain principal monomers selected from the group consisting of $C_1$-$C_{20}$-alkyl (meth) acrylates, vinyl esters of carboxylic acids containing up to 20 carbon atoms, vinyl aromatic compounds containing up to 20 carbon atoms, ethylenically unsaturated nitriles, vinyl halides, non-aromatic hydrocarbons having at least two conjugated double bonds, or mixtures of these monomers. In particular, acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylam ides; styrene or substituted styrenes; butadiene; vinyl acetate or other vinyl esters; acrylonitrile or methacrylonitrile; and the like, may be used. Silicon-containing monomers such as, for example, vinyl trialkoxysilanes including vinyl trimethoxysilane, allyl trialkoxysilanes including allyl trimethoxysilane, (meth)acryloxyalkyl trialkoxysilanes including methacryloxypropyl trimethoxysilane, (meth)acryloxyalkyl alkyldialkoxysilanes including methacryloxypropyl methyldiethoxysilane, (meth)acryloxyalkoxyalkyl trialkoxy silanes including methacryloxyethoxyethyl trimethoxysilane, and mercaptoalkyl trialkoxysilanes including mercaptopropyl trimethoxysilane may also be incorporated, preferably at a level of from about 0.01% to about 6%, by weight based on the weight of the acrylic polymer dispersion. Proportions of ethylenically-unsaturated monocarboxylic acids such as, for example, from 0 to about 7%, by weight, based on the weight of the acrylic emulsion copolymer, methacrylic acid or acrylic acid may also preferably be used.

Preferred $C_1$-$C_{20}$-alkyl (meth)acrylates for the production of (meth)acrylate-based polymers P include (meth)acrylic acid alkyl esters having a $C_1$-$C_{12}$ alkyl radical, such as methyl (meth)acrylate, n-butyl acrylate, ethyl acrylate, and 2-ethylhexyl acrylate. Polymers obtained by polymerization of mixtures of acrylic acid alkyl esters and (meth)acrylic acid alkyl esters can be mentioned as particularly suitable polymers.

Suitable vinyl esters of carboxylic acids containing up to 20 carbon atoms include, for example, vinyl laurate, vinyl stearate, vinyl propionate, vinyl esters of tertiary saturated monocarboxylic acids, vinyl acetate, and mixtures of two or more thereof.

Suitable vinyl aromatic compounds include, for example, vinyltoluene, α- and p-methylstyrene, α-butylstyrene, 4-n-butylstyrene, 4-n-decylstyrene and styrene. Acrylonitrile and methacrylonitrile are presented as examples of suitable nitriles.

Suitable vinyl halides include, for example ethylenically unsaturated compounds substituted by chlorine, fluorine or bromine, such as vinyl chloride or vinylidene chloride, and mixtures thereof.

For the preparation of suitable water-dispersed or -dispersible polymers P based on acrylic monomers there are furthermore suitable non-aromatic hydrocarbons containing from 2 to 8 carbon atoms and at least two olefinic double bonds, such as butadiene, isoprene and chloroprene.

Further monomers that may be present in the water-dispersible polymer in an amount of 0-40% by weight, preferably from 0-20% by weight and most preferably 0.2-10% by weight, are especially $C_1$-$C_{10}$-hydroxyalkyl (meth)acrylates, (meth)acrylamides and derivatives thereof substituted on the nitrogen by $C_1$-$C_4$-alkyl, ethylenically unsaturated carboxylic acids, dicarboxylic acids, their semi-esters and anhydrides, for example (meth)acrylic acid, maleic acid, fumaric acid, maleic acid anhydride, maleic acid and fumaric acid semi-esters and itaconic acid.

Suitable water-dispersed or -dispersible polymers P preferably have a number average molecular weight ($M_n$) in the range of 5,000-200,000 g/mol, preferably 25,000-200,000 g/mol, most preferably 50,000-200,000 g/mol. Suitable water-dispersed or -dispersible polymers P preferably have a weight average molecular weight ($M_w$) in the range of 50,000-800,000 g/mol, preferably 100,000-800,000 g/mol, most preferably 150,000-800,000 g/mol. Preferably, the at least one water-dispersed or -dispersible polymer P has a number average molecular weight ($M_n$) of not more than 200,000 g/mol and a weight average molecular weight ($M_w$) of at least 100,000 g/mol.

The number average and weight average molecular weights can be determined by gel permeation chromatography using polystyrene as standard in a polymer solution in tetrahydrofuran.

The water-dispersed polymers/copolymers based on ethylenically unsaturated monomers which are useful as polymer P can be prepared by free-radical polymerization using substance, solution, suspension or emulsion polymerization techniques, which are known to the person skilled in the art. Preferably, (meth)acrylate-based dispersions of polymer P are obtained by emulsion polymerization, so that aqueous polymer dispersions are obtained.

Suitable polyacrylate dispersions and preparation method thereof are described, for example in EP 0490191 A2, DE 19801892 A1, and in EP 0620243.

Suitable dispersible such polymers or ready-to-use aqueous dispersions thereof are commercially available, for example by BASF under the trade name Acronal®, or by Dow under the trade name Primal®, or by Synthomer under the trade names Plextol® and Revacryl®, or by Wacker under the trade name Vinnapas®.

Preferably, the at least one water-dispersible polymer P has a glass transition temperature ($T_g$), determined with DSC according to ISO 11357 standard, of −60-+10° C., more preferably of −60-0° C., most preferably −50--10° C.

The term "glass transition temperature" refers to the temperature measured by differential scanning calorimetry (DSC) according to ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software.

Cross-Linker C

The single-component adhesive composition according to the present invention comprises as a second essential ingredient at least one water-dispersed or water-dissolved polyvalent metal ion- or carbodiimide-based cross-linker C.

Suitable crosslinking agents may include any crosslinking agent capable of undergoing a reaction with a carboxyl-group containing polymer P as described further above.

Preferably, the crosslinking agent is a carbodiimides reagent, a water-dispersible polymer that contains a carbodiimide group, an oxazoline reagent, a water-dispersible polymer that contains an oxazoline group, a methylated melamine-formaldehyde resin, or a metal salt, in particular a zirconium carbonate salt, such as ammonium zirconium carbonate and potassium zirconium carbonate. Examples of commercially available crosslinking agents include, but are not limited to, Zirmel® (available from MEL Chemicals), Berset® (available from Bercen), Cymel® (available from Cytec), WorleeMin® (available from Worlee), Luwipal® (available from BASF), Zoldine® (available from Dow Chemical), Solucote® (from DSM NeoResins), Carbodilite™ (available from Nisshinbo Chemical Inc.), Resimene® & Maprenal® (available from INEOS), RODA Link® (from TFLUSA), Aerotex (available from Union Ink), Epocros (available from Nippon Shokubai Co., Ltd.), and Permutex® (available from Stahl USA Inc.).

Preferably, said cross-linker C comprises or consists of a polycarbodiimide or a polyvalent metal ion.

As carbodiimide crosslinker, those compounds having two or more carbodiimide groups can be used with no particular restriction. The carbodiimide group shows a group in which one or two hydrogen atoms are extracted from carbodiimide (HN=C=NH). Namely the carbodiimide group is described as —N=C=NH or —N=C=N—. The examples thereof include compound represented by $R^1$—N=C=N—$R^2$—N=C=N—$R^3$, in which $R^1$, $R^2$, and $R^3$ each represents a hydrocarbon group. Further, as the carbodiimide crosslinker, polymers having a carbodiimide group (polycarbodiimide) or the like can be used suitably. Polymers having hydrophilic residues, for example, an ethylene oxide (—$CH_2$—$CH_2$—O—) portion, can be used particularly preferably. Examples of commercial products of polymers having a polycarbodiimide group (polycarbodiimide) usable as the carbodiimide crosslinker in the invention include "Carbodilite V-02", "Carbodilite V-02-L2", "Carbodilite V-04", "Carbodilite E-01", and "Carbodilite E-02", trade name of products manufactured by Nisshinbo Industries, Inc. The carbodiimide crosslinkers can be used each alone or two or more of them may be used in combination.

Particularly preferred are cross-linkers C based on metal ions that can form stable carboxylate complexes with the carboxylate groups of polymer P.

In especially preferred embodiments, said cross-linker C is a zirconium-based cross-linker, preferably zirconium carbonate, in particular ammonium zirconium carbonate and/or potassium zirconium carbonate, most preferably potassium zirconium carbonate.

Suitable such zirconium-based cross-linkers are available, for example, under the trade name LUVOZIRC® (formerly AUERZIRC®) from Lehmann&Voss&Co.

Preferably, said cross-linker C is comprised in the composition with an amount of between 0.5 wt.-% and 1.5 wt.-%, based on the total composition.

Filler F

The inventive water-based single-component adhesive composition comprises between 20 wt.-% and 60 wt.-%, based on the total composition, of at least one filler F with a mean particle size D50 of its primary particles being ≤10 µm, measured by laser diffraction according to the method as described in standard ISO 13320:2009.

The term "filler" refers in the present disclosure to solid particulate materials, which are commonly used as fillers in water-based single-component sealant or adhesive compositions and which preferably have low water-solubility. Preferably, the filler has a water-solubility of less than 0.1 g/100 g water, more preferably less than 0.05 g/100 g water, most preferably less than 0.01 g/100 g water, at a temperature of 20° C.

A filler influences the rheological properties of the uncured composition and also the mechanical properties and the surface nature of the fully cured composition. Suitable fillers are inorganic and organic fillers, as for example natural, ground or precipitated chalks (which consist entirely or primarily of calcium carbonate), and which are optionally coated with fatty acids, more particularly stearic acid; barium sulfate ($BaSO_4$, also called barite or heavy spar), calcined kaolins, aluminum oxides, aluminum hydroxides, silicas, especially finely divided silicas from pyrolysis processes, carbon blacks, especially industrially manufactured carbon black, titanium dioxide, PVC powders, or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be an advantage to use a mixture of different fillers.

Preferably, the filler F is a mineral filler or a mixture of mineral fillers.

Examples of suitable and preferred mineral fillers include calcium carbonate, calcium sulfate and calcium containing minerals such as limestone, calcite, chalk, dolomite, wollastonite, gypsum, apatite, phosphate rock, calcined kaolin, finely divided silica, and flame-retardant fillers, such as hydroxides or hydrates, especially hydroxides or hydrates of aluminum, preferably aluminum hydroxide, and mixtures thereof.

Very preferred as filler F for the composition of the invention is chalk (calcium carbonate). Especially preferred is uncoated chalk, most preferably uncoated, ground chalk, as available for example under the name Omyacarb® (Omya AG, Switzerland).

In other very preferred embodiments, said filler F is a mixture of at least one corpuscular silica and at least one lamellar kaolinite, preferably with aminosilane sizing.

In preferred embodiments, said filler F is comprised in the composition with an amount of between 25 wt.-% and 50 wt.-%, preferably between 30 wt.-% and 45 wt.-%, based on the total composition.

Fillers F preferably have a density of 2-3 kg/L (measured according to EN ISO 787). For fillers with lower or higher density, the preferable amount of filler is expressed more precisely by the volume fraction. In some preferred embodiments, said filler F has a density of less than 2 kg/L or more than 3 kg/L and is comprised in the composition with an amount of between 8% and 36% by volume, preferably between 10% and 30% by volume.

Examples of suitable fillers with lower or higher density are hollow glass spheres (e.g. 3M™ Glass bubbles, 3M Deutschland GmbH, Germany), expanded perlite (e.g. silcel, sh minerals GmbH, Germany), cenospheres (e.g. Fillite, Omya GmbH, Germany), Barium Sulfate (Barytmehl 901, Sachtleben Chemie GmbH, Germany).

Preferably, the filler F has a mean particle size D50, measured by laser diffraction according to the method as described in standard ISO 13320:2009, in the range of 0.1-10.0 µm, more preferably of 0.5-7.5 µm, especially preferably 1.0-5.0 µm.

Most preferably, said filler F has a mean particle size D50 of its primary particles of between 1.0 and 3.0 µm.

According to one or more embodiments, the water content of the single-component adhesive composition is 15.0-45.0% by volume, preferably 20.0-35.0% by volume, most preferably 24.0-30.0% by volume, based on the total volume of the single-component sealant or adhesive composition.

According to one or more embodiments, the single-component adhesive composition has a solids content of 40-90% by weight, preferably 50-88% by weight, most preferably 65-85% by weight.

The solids content as used herein refers to the portion of the aqueous dispersion adhesive composition, which when heated to a temperature of 105° C. for one hour at one atmosphere pressure does not volatilize.

Accordingly, the solids content refers to polymeric materials, non-volatile plasticizers, inorganic solids and non-volatile organic materials, whereas the non-solid portion is generally comprised of water and any organic materials readily volatilized at 105° C.

In preferred embodiments, the single-component adhesive composition contains a base in an amount that renders the pH of the composition to between >7 and 10, preferably between 7.5 and 9. Use of a base helps to improve shelf-life of the composition and facilitates the preparation.

All commercially available, preferably water-soluble, bases may be used in an amount that renders the composition alkaline, preferably within the limits specified above. For example suitable are inorganic bases, such as NaOH, KOH, or LiOH, or organic bases, in particular amines.

The single-component adhesive composition further optionally contains one or more plasticizers, preferably having at least one ester or ether group. The use of a plasticizer depends on the intended application and the polymer P used. Very soft polymers P with a very low $T_g$, such as for example −20° C. or lower, do not necessarily require the addition of a plasticizer.

In preferred embodiments of the single-component adhesive composition, said polymer P has a glass transition temperature $T_g$ of −20° C. or lower, wherein the glass transition temperature ($T_g$) is preferably determined with DSC according to ISO 11357 standard.

The term "glass transition temperature" (abbreviated "$T_g$") refers to the temperature measured by differential scanning calorimetry (DSC) according to the ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software.

Suitable plasticizers are liquid or solid inert organic substances having a low vapor pressure, preferably having a boiling point of above 200° C. measured at standard pressure. Plasticizers can be selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, and phthalates or esters of 1,2-dicarboxy cyclohexane.#

Suitable fatty acid esters include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

The one or more plasticizers preferably having at least one ester or ether group can be present if at all in the single-component adhesive composition with a total amount of 0.5-30.0% by weight, for example 1.0-20% by weight, in particular 2.5-15.0% by weight, based on the total weight of the single-component adhesive composition.

In preferred embodiments of the single-component adhesive composition according to the present invention, the plasticizer preferably having at least one ester or ether group is selected from phthalate esters, cyclohexane esters, or benzoate esters.

The single-component adhesive composition can further comprise one or more tackifiers. Examples of suitable tackifiers may include hydrocarbon resins or hydrogenated products thereof, rosins or hydrogenated products thereof, rosin esters or hydrogenated products thereof, terpene resins or hydrogenated products thereof, terpene phenolic resins or hydrogenated products thereof, and polymerized rosins or polymerized rosin esters or acrylic liquid resins.

The single-component adhesive composition can also contain one or more further additives such as wetting agents, dispersion agents (dispersants), surfactants, emulsifiers, thickeners, anti-foams, flame retardants, stabilizers, colorants, antioxidants, UV-absorbers and/or biocides. Such further additives commonly used in water-based dispersion additives are known to a person skilled in the art.

The single-component adhesive composition according to the present invention preferably comprises additives selected from thickeners, biocides, thixotropy agents, dispersants, emulsifiers, wetting agents, pH adjusting agents, and calcium complexing agents.

In preferred embodiments, the single-component adhesive composition contains a calcium complexing agent.

The at least one calcium complexing agent is preferably selected from the group consisting of mono saccharides, sugar alcohols derived from mono saccharides, sugar acids derived from mono saccharides and salts thereof, and compounds containing at least two dicarboxy amine groups.

Suitable mono saccharides include trioses, tetroses, pentoses, and hexoses. More specific examples include glucose, galactose, mannose, xylose, erythrose, fructose, glycerose, threose, arabinose, ribose, lyxase, dextrose, levulose, and sorbose. Preferred mono saccharides include glucose, mannose, xylose and erythrose.

Suitable sugar alcohols include xylitol, arabinitol, sorbitol, mannitol, erythritol, galactitol, lactitol, maltitol, isomaltitol, maltotriitol. Preferred sugar alcohols include sorbitol, xylitol and erythritol.

Suitable sugar acids derived from mono saccharides include gluconic acid, ascorbic acid, glyceric acid, xylonic acid, neuraminic acid, ketodeoxyoctulosonic acid, glucuronic acid, galacturonic acid, iduronic acid, tartaric acid, mucic acid, and saccharic acid. Preferred sugar acids include glyceric acid, xylonic acid, gluconic acid, and ascorbic acid.

Suitable salts of the sugar acids include all alkali metal and earth alkaline metal salts of the above disclosed sugar acids.

Suitable compounds containing at least two dicarboxy amine groups include ethylenediaminetetraacetic acid (EDTA), diethylenetriaminepentaacetic acid (DTPA), 1,4,7,10-tetraazacyclododecane-N,N',N'',N'''-tetraacetic acid (DOTA), 1,4,7,10-tetraazacyclododecane-N,N',N''-triacetic acid (DO3A), trans(1,2)-cyclohexano diethylenetriaminepentaacetic acid, and N,N-biscarboxymethylglycine. Other suitable calcium ion complexing agents include nitrilotriacetic acid (NTA), iminodiacetic acid (IDA), and iminotriacetic acid (ITA).

Preferably, the at least one calcium ion complexing agent is selected from the group consisting of alkali metal and earth alkaline metal salts of gluconic acid, and ethylene diamine tetra acetate (EDTA). It has been found that the dispersion adhesive compositions comprising one or more calcium ion complexing agents selected from the aforementioned group exhibit fast tack development and good storage stability.

The at least one calcium ion precipitating agent is preferably selected from the group consisting of alkali and earth alkaline metal sulfates, alkali metal disulfates, and earth alkaline metal disulfates, the salts having a water solubility of at least 1.0 g/100 ml, preferably at least 2.5 g/100 ml, most preferably at least 5.0 g/100 ml, at temperature of 20° C. The solubility of a substance in water can be measured as the saturation concentration, where adding more substance does not increase the concentration of the solution, i.e. where the excess amount of the substance begins to precipitate. It has been found that water-based dispersion adhesive compositions comprising one or more calcium ion precipitating agents selected from the aforementioned group exhibit fast tack development and good storage stability. It was also found that although phosphate salts are in principle suitable as calcium ion precipitating agents their presence in the adhesive formulation tends to deteriorate, and in some cases destroy, the storage stability of the dispersion adhesive composition.

Preferably, the calcium ion complexing agent is sodium gluconate and the calcium ion precipitating agent is potassium sulfate. It has been found that water-based dispersion adhesive compositions containing the aforementioned combination of calcium ion complexing agent and precipitating agent have particularly fast tack development and good storage stability and are, therefore, especially suitable for use as flooring adhesives.

Preferably, the one or more calcium ion complexing agents are present in a total amount of 0.1-5.0% by weight, preferably 0.1-2.5% by weight, most preferably 0.1-1.5% by weight, based on the total weight of the dispersion adhesive composition. Dispersion adhesive compositions having the total amount of calcium ion complexing agent below the aforementioned lower limit did not show significant improvements in the rate of tack development based on the calcium complexing agent. On the other hand, dispersion adhesive compositions having the amount of calcium ion complexing agent above the aforementioned upper limit were found to exhibit insufficient storage stability.

In especially preferred embodiments, said calcium complexing agent comprises at least one sulfate and/or gluconate salt of sodium and/or potassium.

Suitable anti-foams are preferably compounds based on mineral oils or silicones. Suitable thickeners include compounds that are based on (meth)acrylic acid copolymers, cellulose derivatives, mineral thickeners such as clays, silica, or mixtures thereof.

Biocides (preservatives) may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides, also denoted as preservatives, can be used in the composition of the present invention.

Suitable as preservatives are water solutions and emulsions of customary biocidal active ingredients, for example benzisothiazolinone (BIT), methylisothiazolinone (MIT), octylisothiazolinone (OIT), chloromethyl isothiazolinone (CMIT), and the like.

Surfactants are furthermore useful and preferred for the compositions according to the present invention. Suitable surfactants include anionic, non-ionic, cationic or amphoteric surfactants, but preferably a non-ionic or anionic surfactant is employed. Generally the amount of surfactant employed will range from about 0.1 to about 5% by weight, based on the total weight of the sealant composition.

Suitable non-ionic surfactants include fatty acid ethoxylates, fatty alcohol ethoxylates, polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. Useful anionic surfactants include those obtained by alkylating aromatic nuclei, sulfonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

According to one or more embodiments, the total amount of the further additives is preferably 0.1-15.0% by weight, more preferably 0.5-10.0% by weight, based on the total weight of the single-component sealant or adhesive composition.

The single-component adhesive composition can be prepared by mixing the ingredients together at room temperature. Any suitable mixing apparatus can be used for the preparation of the adhesive composition without any special restrictions.

The single-component sealant or adhesive composition is especially suitable for adhesively bonding floor coverings, such as sheets, slabs, tiles or boards made of wood, wood composites, thermoplastics, such as polyvinyl chloride (PVC), polyurethane, polyethylene terephthalate (PET) or polyolefin, luxury vinyl tiles (LVT), linoleum, rubber, textiles, metal, mineral substrates such as plaster flooring, natural stone, concrete, cementitious levelling compounds or gypsum-based levelling compounds.

The single-component composition according to the present invention preferably has a Shore A hardness after drying in air during 28 d at 23° C. with a relative humidity of 50% of at least 35, preferably at least 50, more preferably at least 60.

According to another aspect of the present invention, a method for adhesively joining two substrates is provided, the method comprising steps of:
  i) Applying the single-component adhesive composition according to the present invention to a first substrate to form a wet layer of sealant on the first substrate, or applying the single-component adhesive according to the present invention to a first substrate and to a second substrate to form a wet layer of adhesive on both substrates,
  ii) Exposing the wet layer to air,
  iii) Joining a second substrate to the first substrate such that the still wet layer on the first substrate is in contact with the second substrate, or such that both wet layers on both substrates are in contact with each other, to effect bonding there between.

In a preferred embodiment of above method, the second substrate consists of tiles, sheets, or bars made out of a material selected from the list consisting of polyvinyl chloride, polyolefin, polyurethane, polyethylene terephthalate, linoleum, rubber, textile, wood, and wood composites.

The single-component adhesive composition can be applied on the surface of the substrate using for example, a toothed trowel or a roller.

According to another aspect of the present invention, use of the single-component adhesive composition of the present invention for sealing a joint between two substrates and/or for adhesively joining two substrates together is provided.

Yet another aspect of the present invention is a dried and/or cured single-component adhesive composition according to the present invention.

EXAMPLES

The invention is further explained in the following experimental part which, however, shall not be construed as limiting to the scope of the invention. The proportions and percentages indicated are by weight, unless otherwise stated. Accordingly, "wt.-%" means percentage by weight, based on the weight of the total composition given in the respective case. "RT" means room temperature or ambient temperature and describes a temperature of 23° C. The abbreviation "r.h." or "% r.h." means relative humidity (in %) of the ambient air in a given example or test method.

Test Methods

The wet peel strengths of exemplary and reference adhesive compositions obtained with different airing times were determined by measuring average peel resistance upon peeling PVC-strips bonded to wood particle board with the adhesive compositions.

For the peel resistance measurement, adhesive composition was first applied with a suitable notched trowel on a sheet of wood particle board. The thickness of the applied adhesive layer was approximately 250 g/m². After predefined airing time of 20 minutes, PVC strips having dimensions of 5 cm (width)×20 cm (length)×2 mm (thickness) were contacted with the surface of the adhesive layer and pressed against the adhesive layer with a standardized 2 kg roller (according to DIN EN 1372). The adhesive layer was allowed to set for 15 minutes before measuring the peel strength.

The average peel resistance was then measured with a spring scale during manual peeling of PVC strips from the surface of the wood particle board at a peeling angle of 90°. The peeling of the PVC strip was continued until the strip was completely detached from the wood particle board. The representative wet peel strength was calculated as peel force per unit width of the PVC strip [N/mm] based on the peel resistance measured when half of the PVC strip was peeled off.

The wet peel strength values obtained with the exemplary and reference adhesive compositions presented in Table 2 have been calculated as an average of wet peel strength values obtained with five PVC-strips that were bonded with the same adhesive composition to the wood particle board.

A wet peel strength of at least 0.2 N/mm is considered enough for the application of floor coverings.

The dimensional stability (dimensional expansion) was determined according to EN 14565 (Annex C). Three test specimens made of polyolefinic flooring sheets (Tarkett iQ One, available from Tarkett AB, Sweden) were conditioned and measured in machine direction and transverse machine direction. The test pieces were bonded to mineral fibre board pieces with the respective adhesive composition to be tested in an amount of 250 g/m². The test pieces were measured 24 hours after the adhesion. Subsequently, the surface temperature was raised to 50° C. within one hour. This temperature was maintained for three hours. The final measurement was done at the end of this 3 h period while the surface temperature of the floor covering is still 50° C.

A dimensional expansion of 0.2% is the minimal requirement of EN 14565. Values <0.1% are considered excellent.

The dimensional stability under thermal influence is related to the shear strength properties of a cured composition. Such materials with higher shear strength (or shear stiffness) show a lower dimensional expansion when exposed to heat. Hence, the dimensional stability of a cured adhesive composition according to the invention can also be assessed by measuring its shear strength.

For this, Shear strength was measured to determine the shear strength of the cured adhesive compositions according to EN 1373. Results were determined by applying the adhesive compositions on a plywood board with the dimensions 60×50×5 mm³. The adhesive was applied with a notched trowel of TKB A2 type to an area of 20×50 mm² at the lower end of plywood board and a second plywood board with identical dimensions was pressed with a 2 kg weight into the adhesive bed so that the plywood boards overlap only in the area of the adhesive bed.

Five specimens of this type were made and cured for 28 days at room temperature. Afterwards, a continually increasing shear stress was applied to the adhesive through a diametrical tearing of both plywood boards by a tensile testing machine. The shear stress at break is recorded and reported as "Shear strength wood/wood (EN 1373)" in Tables 2 and 3.

Raw Materials

The raw materials and their description regarding important properties which were used for the example sealant compositions are shown in Table 1.

TABLE 1

Raw materials used for the example compositions.

| Raw material | Description |
|---|---|
| Acrylic polymer P1 | Acrylic copolymer, $T_g$ ~−30° C. to −40° C. (solid content of dispersion, 58-62% solids); Vinnapas ® EAF 67 (Wacker) |
| Acrylic polymer P2 | Acrylic polymer, $T_g$ ~−40° C. to −50° C. (solid content of dispersion, 68-72% solids); Acronal ® A 200 (BASF) |
| Filler F1 | Calcium carbonate with D50 of 40 μm; Omyacarb ® 40 (Omya) |
| Filler F2 | Calcium carbonate with D50 of 10 μm; Omyacarb 10 (Omya) |
| Filler F3 | Calcium carbonate with D50 of 3 μm; Etiquette Rouge ® (Omya) |
| Filler F4 | Conglomerate of silica and calcined kaolinite with D50 of 2 μm; Aktisil ® AM (Hoffmann Mineral) |
| Biocide | Biocide (2.5% solution of MIT and BIT); Acticide ® MBS (Thor) |
| Dispersant | Sodium salt of polyacrylic copolymer dispersed in water; Dispex ® AA 4135 (BASF) |
| Cross-linker C1 | Potassium zirconium carbonate $K_2[Zr(CO_3)_2(OH)_2]$ (Lehmann&Voss) |
| Cross-linker C2 | Ammonium zirconium carbonate $(NH_4)_2[Zr(CO_3)_2(OH)_2]$ (Lehmann&Voss) |
| Acrylic Thickener | Rheovis ® AS 1125 (BASF) |
| NaOH 10% | 10% NaOH in water for pH adjustment |
| Water | Water |

Mixing Procedure

All example compositions were prepared in a lab mixer using the following procedure:

a) Adjusting of the dispersion of polymer P1 or P2 (56-70% solids, respectively) to pH 8 by using 10% NaOH solution.

b) Addition of the liquid raw materials except the organic thickener.

c) Addition of the powder raw materials in several steps, each interrupted by stirring. After addition of all powders, dispersing of the powders during 10 min.

d) Addition of the organic thickener.

e) Mixing under vacuum and filling of the preparations into pails.

f) Storing the pails for at least 24 h at 23° C. and 50% r.h. prior to initiating the testing procedure.

Details of the Example Compositions

Several non-inventive reference (denoted "Ref.") and inventive example compositions were made from the raw materials in Table 1 using the formulation details in Table 2 and Table 3 below for each experiment.

TABLE 2

Example compositions and test results. Non-inventive reference examples are denoted "Ref." "n/m" means that this value was not measured.

| Composition (numbers in wt.-%) | C-1 Ref. | C-2 Ref. | C-3 Ref. | C-4 Ref. | C-5 | C-6 | C-7 |
|---|---|---|---|---|---|---|---|
| Acrylic polymer P1 | 32 | 32 | 32 | 32 | 32 | 32 | 32 |
| Filler F1 | 40 | — | — | 40 | — | — | — |
| Filler F2 | — | 41 | — | — | 40 | — | — |
| Filler F3 | — | — | 41 | — | — | 40 | 20 |
| Filler F4 | — | — | — | — | — | — | 20 |

TABLE 2-continued

|  | C-1 Ref. | C-2 Ref. | C-3 Ref. | C-4 Ref. | C-5 | C-6 | C-7 |
|---|---|---|---|---|---|---|---|
| Biocide | 0.25 | 0.25 | 0.25 | 0.25 | 0.25 | 0.25 | 0.25 |
| Dispersant | 0.4 | 0.4 | 0.4 | 0.4 | 0.4 | 0.4 | 0.4 |
| Cross-linker C1 | — | — | — | 1 | 1 | 1 | 1 |
| Acrylic Thickener | 0.4 | 0.4 | 0.4 | 0.4 | 0.4 | 0.4 | 0.4 |
| Water | 26.95 | 25.95 | 25.95 | 25.95 | 25.95 | 25.95 | 25.95 |
| Test results |  |  |  |  |  |  |  |
| Dimensional expansion of polyolefinic covering (Tarkett iQ one) at 50° C. after 1 d of curing (EN 14565) [%] | 0.13 | 0.15 | 0.10 | 0.13 | 0.07 | 0.07 | 0.04 |
| Wet peel strength PVC (EN 1372) [N/mm] | 0.4 | 0.5 | 0.5 | 0.5 | 0.5 | 0.3 | 0.3 |
| Shear strength wood/wood (EN 1373) [MPa] | n/m | 1.18 | n/m | n/m | 1.49 | n/m | 1.73 |

Table 2 also shows that the test results of the dimensional stability of the floor coverings is significantly improved in the experiments according to the invention. This is further confirmed by the additional shear strength measurements. At the same time, the wet peel strength is not significantly affected, and all samples showed a sufficient wet peel strength for practical application of floor coverings.

Table 3 shows additional exemplary compositions, comparing different crosslinkers C.

TABLE 3

Example compositions and test results. Non-inventive reference examples are denoted "Ref."

|  | C-8 Ref. | C-9 | C-10 |
|---|---|---|---|
| Composition (numbers in wt.-%) |  |  |  |
| Acrylic polymer P2 | 31 | 31 | 31 |
| Filler F2 | 35 | 35 | 35 |
| Biocide | 0.25 | 0.25 | 0.25 |
| Dispersant | 0.4 | 0.4 | 0.4 |
| Cross-linker C1 | — | 0.6 | — |
| Cross-linker C2 | — | — | 0.6 |
| Acrylic Thickener | 0.4 | 0.4 | 0.4 |
| Water | 31.75 | 31.15 | 31.15 |
| Test results |  |  |  |
| Wet peel strength PVC (EN 1372) [N/mm] | 0.52 | 0.62 | 0.56 |
| Shear strength wood/wood (EN 1373) [MPa] | 0.62 | 0.78 | 0.73 |

The test results in Table 3 show that the inventive examples containing either crosslinker C have improved shear strength (and thus better dimensional stability) and at the same time even improved wet peel strength compared to the reference example.

The invention claimed is:

1. A single-component adhesive composition, comprising:
   a) from 10 wt. % to 50 wt. % by weight, based on the total composition, of an aqueous acrylic polymer dispersion comprising water and at least one water-dispersed acrylic polymer P,
   b) from 0.2 wt. % to 2 wt. %, based on the total composition, of at least one water-dispersed or water-dissolved cross-linker C that can react with carboxylate groups;
   c) from 20 wt % to 60 wt. %, based on the total composition, of at least one filler F with the mean particle size D50 of its primary particles being ≤10 μm,
   wherein said at least one water-dispersed acrylic polymer P contains free carboxylic acid groups,
   wherein the at least one filler F is a mixture of at least one corpuscular silica and at least one lamellar kaolinite, and
   wherein the weight amount of filler F in the composition exceeds the weight amount of polymer P in the composition.

2. The single-component adhesive composition according to claim 1, wherein the cross-linker C comprises or consists of a polycarbodiimide or a polyvalent metal ion.

3. The single-component adhesive composition according to claim 2, wherein the cross-linker C comprises or consists of a zirconium carbonate.

4. The single-component adhesive composition according to claim 1, wherein the amount of filler F in the composition is from 25 wt % to 50 wt %, based on the total composition.

5. The single-component adhesive composition according to claim 1, wherein the filler F has a mean particle size D50 of its primary particles of between 1.0 and 3.0 μm.

6. The single-component adhesive composition according to claim 1, wherein the at least one water-dispersed acrylate polymer P is selected from poly(meth)acrylate homopolymers, poly(meth)acrylate copolymers, styrene-(meth)acrylate copolymers, and vinyl-acetate-(meth)acrylate copolymers.

7. The single-component adhesive composition according to claim 1, wherein the composition furthermore comprises additives selected from thickeners, biocides, thixotropy agents, dispersants, emulsifiers, wetting agents, pH adjusting agents, and calcium complexing agents.

8. The single-component adhesive composition according to claim 7, wherein the composition contains a calcium complexing agent comprising at least one sulfate and/or gluconate salt of sodium and/or potassium.

9. The single-component adhesive composition according to claim 1, wherein the composition contains a base in an amount that renders the pH of the composition to between >7 and 10.

10. The single-component adhesive composition according to claim 1, wherein the polymer P has a glass transition temperature $T_g$ of −20° C. or lower.

11. A method for adhesively joining two substrates, the method comprising the steps of:
   i) applying the single-component adhesive composition according to claim 1 to a first substrate to form a wet layer of adhesive on the first substrate, or applying the single-component adhesive according to claim 1 to a first substrate and to a second substrate to form a wet layer of adhesive on both substrates,
   ii) exposing the wet layer to air,
   iii) joining a second substrate to the first substrate such that the still wet layer on the first substrate is in contact with the second substrate, or such that both wet layers on both substrates are in contact with each other, to effect bonding there between.

12. The method according to claim 11, wherein the second substrate consists of tiles, sheets, or bars, made from a material selected from the list consisting of polyvinyl chloride, polyurethane, polyethylene terephthalate, polyolefin, linoleum, rubber, textile, wood, and wood composites.

13. A dried and/or cured single-component adhesive composition according to claim 1.

\* \* \* \* \*